United States Patent
Pachakkil et al.

(10) Patent No.: US 12,235,133 B2
(45) Date of Patent: Feb. 25, 2025

(54) SENSOR ASSEMBLY FOR DETECTING ROTATION OF A SHAFT ABOUT AN AXIS OF ROTATION

(71) Applicant: Valeo Schalter und Sensoren GmbH, Bietigheim-Bissingen (DE)

(72) Inventors: Sageesh Pachakkil, Bietigheim-Bissingen (DE); Ekkehart Fröhlich, Bietigheim-Bissingen (DE); Dirk Rachui, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 139 days.

(21) Appl. No.: 18/013,371

(22) PCT Filed: Jun. 21, 2021

(86) PCT No.: PCT/EP2021/066748
§ 371 (c)(1),
(2) Date: Dec. 28, 2022

(87) PCT Pub. No.: WO2022/002654
PCT Pub. Date: Jan. 6, 2022

(65) Prior Publication Data
US 2023/0341243 A1    Oct. 26, 2023

(30) Foreign Application Priority Data
Jun. 29, 2020    (DE) ............... 10 2020 117 041.6

(51) Int. Cl.
*G01R 5/14*    (2006.01)
*G01D 5/14*    (2006.01)
*G01L 3/10*    (2006.01)

(52) U.S. Cl.
CPC .............. *G01D 5/142* (2013.01); *G01L 3/10* (2013.01); *G01D 2205/20* (2021.05)

(58) Field of Classification Search
None
See application file for complete search history.

(56) References Cited

U.S. PATENT DOCUMENTS

2013/0015844 A1*  1/2013  Bogos ................. G01D 18/001
                                                    324/207.2
2014/0132248 A1*  5/2014  Mitsuya .............. G01R 15/207
                                                    324/117 R
(Continued)

FOREIGN PATENT DOCUMENTS

DE         2707083 B1   12/1977
DE    102015122179 A1    6/2017
(Continued)

OTHER PUBLICATIONS

International Search Report and Written Opinion in corresponding International Application No. PCT/EP2021/066748, mailed Sep. 28, 2021 (11 pages).

(Continued)

*Primary Examiner* — Jas A Sanghera (57) ABSTRACT

The invention relates to a sensor assembly (10) for detecting rotation of a shaft about an axis of rotation (12), said sensor assembly having a housing (24) in which at least one magnetic field sensor (14) is arranged. The at least one magnetic field sensor (14) is designed to acquire a variation in a magnetic field generated by a magnet device (16) in the sensor assembly (10), which variation is associated with the rotation of the shaft about the axis of rotation (12). A shield device (30) arranged on the housing (24) is provided to shield the at least one magnetic field sensor (14) from the surroundings (28) of the sensor assembly (10). The shield device (30) can be removed from the housing (24), with the (Continued)

shield device (30) being retained on the housing (24) by means of a latching connection.

11 Claims, 4 Drawing Sheets

(56) References Cited

U.S. PATENT DOCUMENTS

| | | | |
|---|---|---|---|
| 2014/0167750 A1* | 6/2014 | Akieda | ............... G01R 15/202 |
| | | | 324/251 |
| 2017/0315004 A1 | 11/2017 | Toyama | |

FOREIGN PATENT DOCUMENTS

| | | |
|---|---|---|
| DE | 102016100499 A1 | 7/2017 |
| DE | 102016104275 A1 | 9/2017 |
| DE | 102016124370 A1 | 6/2018 |
| DE | 102017116454 A1 | 1/2019 |
| EP | 1132709 A2 | 9/2001 |
| WO | 2019/016124 A1 | 1/2019 |

OTHER PUBLICATIONS

German Search Report issued in corresponding German Application No. 10 2020 117 041.6, dated Oct. 27, 2021 (6 pages).

\* cited by examiner

SENSOR ASSEMBLY FOR DETECTING ROTATION OF A SHAFT ABOUT AN AXIS OF ROTATION

The invention relates to a sensor assembly for detecting rotation of a shaft about an axis of rotation. The sensor assembly comprises a housing in which at least one magnetic field sensor is arranged. The at least one magnetic field sensor is designed to detect a change in a magnetic field generated by a magnetic device of the sensor assembly, said change being associated with the rotation of the shaft about the axis of rotation. A shielding device is arranged on the housing, said shielding device being designed for shielding the at least one magnetic field sensor relative to an environment of the sensor assembly. The shielding device is removable from the housing.

Such a sensor assembly is described, for example, in WO 2019/016124 A1. Here, two magnetic field sensors are arranged on a printed circuit board, which is accommodated in an electronic module housing. The electronic module housing includes a housing lower part and a housing cover. In order to achieve a magnetically shielding effect, the electronic module housing can be produced from a plastic which is filled with particles containing iron and/or nickel. Furthermore, according to WO 2019/016124 A1, provision may be made for an outer housing shell, which has a magnetically shielding effect, to be slipped over the housing cover, which is fixed to the housing lower part. In this configuration, the housing shell is produced from a plastic filled with particles containing iron and/or nickel.

In the case of the sensor assembly according to WO 2019/016124 A1, it is a challenge to ensure reliable mounting of the housing shell, which serves as a magnetic shielding device, on a housing part, which is formed by the housing cover and the housing lower part. In particular, it is important to ensure that the housing shell is held on this housing part in the desired position providing the magnetic shielding effect even after the housing shell has been repeatedly removed and slipped over the housing cover again.

This is difficult to ensure above all when the sensor assembly is exposed to vibrations or oscillations during operation, as can occur, for example, when the sensor assembly is arranged on a steering shaft of a motor vehicle. Such vibrations can also lead to audible and/or perceptible movements of the housing shell relative to the housing part.

It is therefore the object of the present invention to provide a sensor assembly of the type mentioned at the beginning, in which the arrangement of the shielding device on the housing is particularly reliable.

This object is achieved by a sensor assembly having the features of patent claim 1. Advantageous configurations with expedient developments of the invention are specified in the dependent patent claims and in the description.

The sensor assembly according to the invention for detecting a rotation of a shaft about an axis of rotation comprises a housing in which at least one magnetic field sensor is arranged. The at least one magnetic field sensor is designed to detect a change in a magnetic field, said change being associated with the rotation of the shaft about the axis of rotation. The magnetic field is generated here by a magnetic device of the sensor assembly. The sensor assembly further comprises a shielding device arranged on the housing for shielding the at least one magnetic field sensor relative to an environment of the sensor assembly, the shielding device being removable from the housing. The shielding device is held on the housing by means of a latching connection. Consequently, a particularly reliable arrangement of the shielding device on the housing is ensured because the shielding device is latched to the housing.

In other words, the provision of the latching connection means that the shielding device is held on the housing in a very secure and/or reproducible and reliable manner. Furthermore, the shielding device can be simply detached from the housing by the latching connection being released.

The shielding device advantageously ensures that the at least one magnetic field sensor of the sensor assembly is disturbed as little as possible by external magnetic fields which can emanate from magnets located in the environment of the sensor assembly. External magnetic fields can be generated by electric motors, loudspeakers or the like arranged in the vicinity of the sensor assembly, particularly in a sensor assembly for detecting the rotation of a steering shaft of a motor vehicle about the axis of rotation of the steering shaft. In particular in such an environment, arranging the shielding device on the housing of the sensor assembly is therefore of particular advantage.

Fixing the shielding device, which is designed for shielding from external magnetic fields, on the housing via the latching connection is advantageously associated with simple and quick assembly of the shielding device on the housing and a corresponding removal thereof. Furthermore, because the shielding device is removable from the housing, an advantageous, modular design of the sensor assembly is achieved.

The shielding device preferably has at least one spring element which lies against the housing when the shielding device is held on the housing by means of the latching connection. Since the at least one spring element applies a spring force to the housing or the shielding device is supported on the housing by means of the at least one spring element, rattling of the shielding device can be avoided very simply and effectively when the shielding device is held on the housing. Accordingly, audible and/or perceptible impairments associated with such a rattling are also avoided.

The at least one spring element accordingly ensures in particular that the shielding device is held on the housing without vibrating. This is also of importance in particular when the sensor assembly is used in a motor vehicle, since vibrations are introduced into the sensor assembly as the motor vehicle is being driven. Accordingly, it is expedient to prevent as substantially as possible movements of the shielding device relative to the housing that are caused by such vibrations.

Preferably, at least one first latching element is formed on the shielding device and at least one second latching element is formed on the housing. The second latching element is brought into engagement with the first latching element to produce the latching connection. Consequently, a very robust latching connection is provided. This is true in particular if the shielding device has a plurality of first latching elements and the housing has a corresponding plurality of second latching elements.

The latching elements can be designed as latching openings and as latching lugs corresponding thereto, with it being possible for the respective latching lug to be brought into engagement with the respective latching opening in order to produce the latching connection. Such latching elements can be provided particularly simply and with little effort and are nevertheless very reliable in respect of an easily achievable and at the same time secure mounting of the shielding device on the housing.

In particular, the at least one latching opening can be formed on the shielding device and the at least one latching lug on the housing. This is advantageous in respect of the weight of the sensor assembly, since the shielding device is preferably formed from at least one metal, while the housing is preferably formed from plastic.

The shielding device can preferably be slid onto the housing in the radial direction with respect to the axis of rotation. This is advantageous in respect of simple installation of the shielding device.

It has also been shown to be advantageous if the shielding device comprises a U profile in cross section with a casing wall aligned substantially parallel to the axis of rotation and two wall sections extending from the casing wall substantially in the radial direction. In this case, a housing region of the housing is arranged between the wall sections, the at least one magnetic field sensor being accommodated in the housing region. Such a shielding device, in particular exclusively having the casing wall and the two wall sections, can be provided particularly simply and with little effort, in particular by deep-drawing a blank formed from a magnetically shielding material, which blank is preferably formed from at least one metal.

Furthermore, the arrangement of the housing region accommodating the at least one magnetic field sensor in the direction of the axis of rotation between the wall sections and the radial shielding of the housing region by the casing wall make it possible for the at least one magnetic field sensor to be particularly well from being subjected to external magnetic fields, i.e. magnetic fields possibly present in the vicinity of the sensor assembly.

The at least one first latching element is preferably formed on at least one of the wall sections. This is because the shielding device can thereby be fixed securely on the housing in the radial direction.

It has also been shown to be advantageous if the at least one second latching element is formed on a free end region of a profile part which is arranged on a wall of the housing region. In this case, the end region of the profile part having the second latching element is spaced apart from the wall of the housing region in the direction of the axis of rotation. The provision or formation of the second latching element on the free end region of the profile part means that, when the shielding device is pushed onto the housing in the radial direction, the end region of the profile part that has the second latching element can be pushed aside resiliently in order to then form the latching connection with the first latching element.

In addition, the spacing of the profile part from the wall of the housing region in the direction of the axis of rotation ensures that the wall section is positioned at a certain distance from the at least one magnetic field sensor even when the shielding device is attached to the housing. This is advantageous in respect of the fact that the detection of the magnetic field generated by the magnetic device of the sensor assembly is not negatively influenced or disturbed by the shielding device itself.

The profile part, which is arranged on the wall of the housing region and can in particular be formed integrally with a housing material of the housing, can be designed to be substantially L-shaped in cross section. In this case, the short leg of the L shape is preferably adjacent to the wall of the housing region, while the long leg of the L shape forms the free end region of the profile part. Particularly good resilience of the profile part when pushing the shielding device onto the housing can be achieved by such a shaping.

Furthermore, it is advantageous if the profile part is curved at a transition between the end region having the second latching element or between the long leg and the short leg. This is because it is then particularly easy to push the shielding device onto the housing. This is because in this way the shielding device simply and reliably avoids becoming caught on the profile part while being pushed onto the housing, i.e. before the latching elements of the latching connection are brought into engagement with one another.

At least one hook element is preferably formed on at least one of the wall sections, which hook element comprises a first leg extending in the direction of the axis of rotation and a second leg protruding from the first leg. In this case, the second leg engages behind a holding section of a holding part which is arranged on the housing. Such a configuration of interlocking hook elements of the shielding device, on the one hand, and holding parts of the housing, on the other hand, allows the shielding device to be secured in its position particularly well and reliably in the direction of the axis of rotation. This is because the second leg which protrudes from the first leg and engages behind the holding section of the holding part prevents the shielding device held on the housing from being able to be moved away from the housing in the direction of the axis of rotation.

The holding part, which comprises the holding section, is preferably formed integrally with the housing. In this way, the holding part is provided with particularly little effort. This is especially true if the housing is formed from plastic.

The hook element is preferably formed from a wall material of the wall section. The at least one hook element can thus be provided particularly easily and with little effort, for example by the hook element being cut free from the wall material of the wall section and then being brought by bending into the desired shape. This can be undertaken by means of a correspondingly designed stamping and bending tool, which can be used when manufacturing the shielding device.

The holding part is preferably arranged on a wall of the housing region in which the at least one magnetic field sensor is accommodated. In this case, the holding section of the holding part is spaced apart from the wall of the housing region in the direction of the axis of rotation. On the one hand, this facilitates the insertion of the second leg of the at least one hook element formed on the wall section. Furthermore, this is advantageous with regard to a spacing of the wall section from the wall of the housing region. This spacing also prevents a close proximity of the wall section to the at least one magnetic field sensor from affecting or impairing the detection of the change in the magnetic field.

The holding section can have a rib which tapers toward the second leg. As a result, on the one hand, a contact surface of the holding section on the second leg of the hook element is comparatively small. This is advantageous with regard to the vibration-free or non-rattling fixing of the shielding device to the housing and for the installation of the shielding device.

In addition, such a rib converging to a point can preferably be squeezed at least a little or elastically deformed when the shielding device is pushed onto the housing in the radial direction. On the one hand, this makes it easier to attach the shielding device to the housing. On the other hand, the elastic deformability of the rib is beneficial to fixing the shielding device to the housing so that it avoids rattling or vibrating.

It has also been shown to be advantageous if at least one of the wall sections, with an inner side facing the housing region, lies against at least one web. In this case, the web protrudes in the direction of the axis of rotation from a wall of the housing region in which the at least one magnetic field sensor is accommodated. By providing the at least one web, which can in particular be formed integrally with the wall of the housing region, a predetermined distance of the wall section from the wall of the housing region can be easily set.

In addition, particularly in interaction with the preferably provided hook element of the wall section, a very good fixing of the shielding device in the direction of the axis of rotation can be achieved if the housing has the at least one web.

The at least one web can have an end region which tapers toward the inner side of the wall section. Such an end region of the web converging to a point means that there is, on the one hand, a comparatively small contact surface for the web on the inner side of the wall section. This is advantageous for the vibration-free or non-rattling mounting of the shielding device on the housing and in respect of simple assembly of the shielding device.

In addition, such a web converging to a point can preferably be at least a little squeezed together or elastically deformed when the shielding device is pushed onto the housing in the radial direction. This makes it easier to attach the shielding device to the housing. Furthermore, such an elastic deformability of the end region of the web, which is designed in the manner of a squeezing rib, is beneficial to the arrangement or mounting of the shielding device on the housing in a manner so as to avoid rattling.

At least one of the wall sections preferably has a recess which is open toward the axis of rotation. A projection is accommodated in the recess as a result of the shielding device being pushed onto the housing. The projection protrudes from the housing in the direction of the axis of rotation. A projection of this type advantageously provides a guiding aid for pushing the shielding device onto the housing. This is because the projection, which preferably engages in the shielding device with at most little or almost no play, ensures that the shielding device is positioned correctly as it is being pushed onto the housing. This is beneficial to the formation of the reliable latching connection, which arises as a result of the shielding device being pushed onto the housing.

The projection can have a holding leg which lies against an outer side of the wall section that faces away from the housing region. Such a holding leg prevents the shielding device from being able to be detached from the housing in the direction of the axis of rotation. In addition, the holding leg advantageously contributes to the fact that, as the shielding device is being pushed onto the housing, the shielding device is positioned in the direction of the axis of rotation, which ensures a particularly reliable formation of the latching connection.

The sensor assembly can be designed to detect a torque applied when rotating the shaft about the axis of rotation. This is particularly advantageous when the shaft is designed as a steering shaft of a motor vehicle, with, owing to the detected torque, a steering movement performed by a driver being supported by a drive device of a power steering system or similar steering aid of the motor vehicle. By means of the drive device of the power steering system, which is in the form, for example, of an electric motor, the force that has to be applied by the driver of the motor vehicle to operate a motor vehicle steering wheel which is connected to the steering shaft can be reduced.

Additionally or alternatively, the sensor assembly can be designed to detect an angle of rotation of the shaft. This is also particularly advantageous when the shaft is designed as a steering shaft of a motor vehicle, in which case the angle of rotation of the steering shaft is intended to be detected with respect to a normal position or straight-ahead position of the steering shaft or of the steering wheel connected to the steering shaft.

Possibilities of configuring the sensor assembly such that it can be used to detect the torque and/or to detect the angle of rotation are explained, for example, in WO 2019/016124 A1 or in DE 10 2016 124 370 A1 mentioned at the beginning, and therefore reference is made to these documents in respect of such technical configurations. Corresponding technical configurations can accordingly also be provided in the case of the sensor assembly described here.

The features and combinations of features mentioned above in the description and the features and combinations of features mentioned below in the description of the figures and/or shown in the figures alone may be used not only in the respectively indicated combination but also in other combinations without departing from the scope of the invention. The invention is therefore also intended to be considered to include and disclose embodiments that are not explicitly shown and explained in the figures but that emerge from the elucidated embodiments, and can be generated, by way of separate combinations of features. Embodiments and combinations of features that therefore do not have all the features of an originally formulated independent claim should also be regarded as disclosed. Furthermore, embodiments and combinations of features, in particular by way of the embodiments outlined above, that go beyond or deviate from the combinations of features outlined in the back references of the claims should be regarded as disclosed.

Further features of the invention emerge from the claims, the figures and the description of the figures. In the figures:

Figure 1:
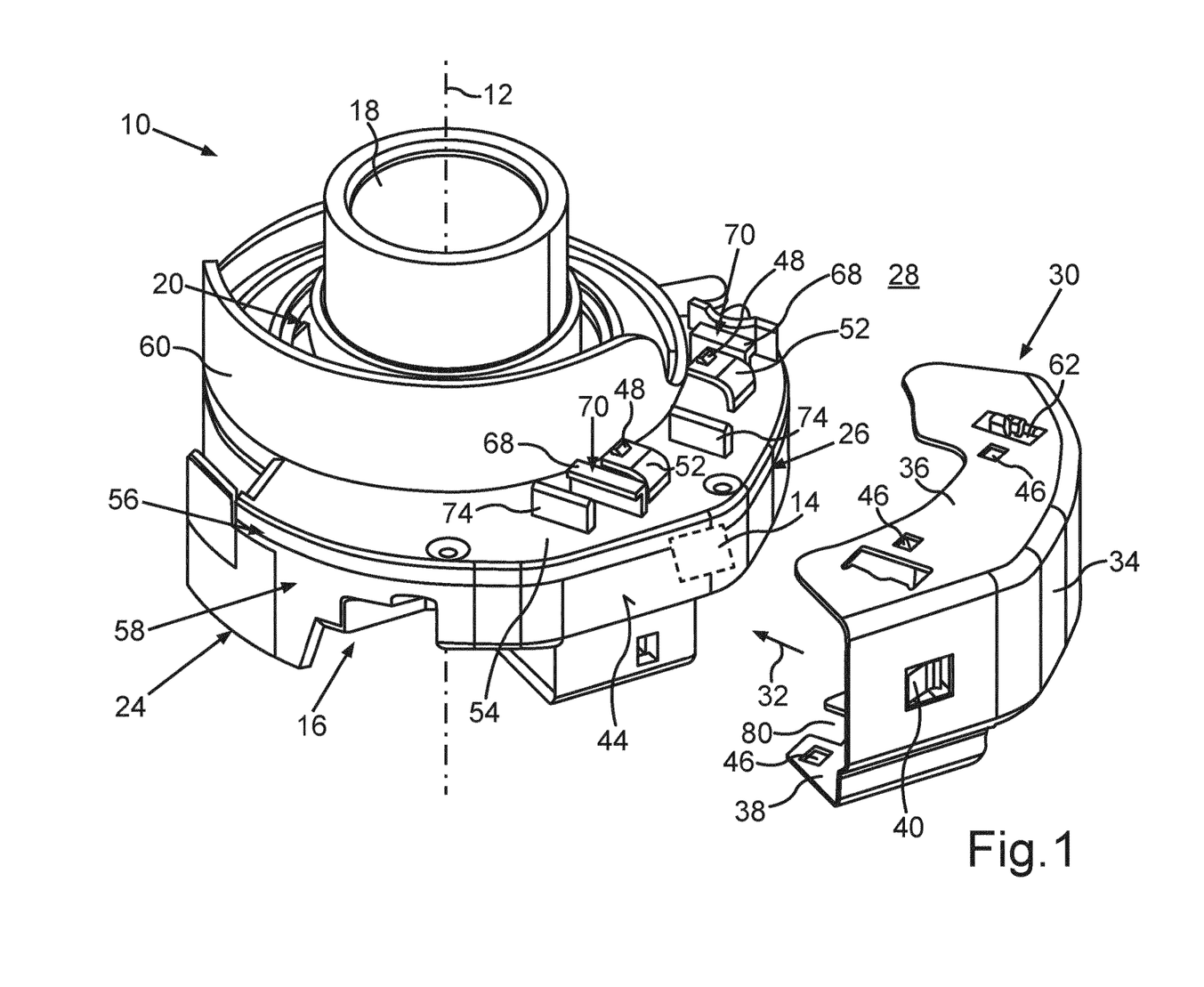
FIG. 1 shows schematically and perspectively a sensor assembly for detecting a torque applied when rotating a shaft about an axis of rotation and for detecting an angle of rotation of the shaft, a magnetic shielding device of the sensor assembly being shown removed from a housing of the sensor assembly, in which magnetic field sensors of the sensor assembly are accommodated.

In FIG. 1 a sensor assembly 10 for detecting a rotation of a shaft (not shown) about an axis of rotation 12 is shown schematically and perspectively. The shaft can be designed in particular as a steering shaft of a motor vehicle. Accordingly, the sensor assembly 10 can be designed in particular to detect a torque applied to the steering shaft. Additionally or alternatively, the sensor assembly 10 can be designed to detect an angle of rotation of the steering shaft. The angle of rotation indicates here how far the steering shaft is rotated, starting from a starting position or neutral position or straight-ahead position of a steering wheel (not shown) of the motor vehicle that is coupled to the steering shaft. If the sensor assembly 10 is designed as a torque sensor, the sensor assembly 10 can be used to detect what torque a driver of the motor vehicle is applying to the steering shaft via the steering wheel when the driver rotates the steering wheel about the axis of rotation 12.

In the present case, for detecting the rotation of the shaft about the axis of rotation 12, the sensor assembly 10 has at least one magnetic field sensor 14 which is shown only schematically in FIG. 1 and not in respect of its actual spatial arrangement. The magnetic field sensor 14, or the magnetic field sensors, of which only the magnetic field sensor 14 shown schematically in FIG. 1 is illustrated by way of example here, is or are designed to detect a change in a magnetic field, which change is associated with the rotation of the shaft about the axis of rotation 12.

In this case, the magnetic field is detected in a manner known per se by a magnetic device 16 of the sensor assembly 10, the precise structure and the precise operation of which need not be discussed in detail here. This is because the basic operation of such a magnetic device 16 is known to the person skilled in the art. For explanatory purposes, however, it should be mentioned here that the magnetic device 16 comprises a ring-shaped magnet (not shown), which preferably has a plurality of pole pairs. This annular magnet or ring magnet is connected to a first shaft part of the shaft (not shown) for rotation therewith.

The shaft, in particular the steering shaft, is namely divided in the axial direction, i.e. in the direction of the axis of rotation 12, when the sensor assembly 10 is designed to detect the torque applied to the shaft and has the first shaft part and a second shaft part. A sleeve 18, which is part of a stator 20 of the magnetic device 16, is connected to the second shaft part for rotation therewith. The stator 20 can, for example, comprise two ring-shaped stator parts (not shown) which have stator teeth which extend in the direction of the axis of rotation 12 and face one another. In this case, the number of stator teeth preferably corresponds to a number of pole pairs of the ring magnet.

Figure 4:
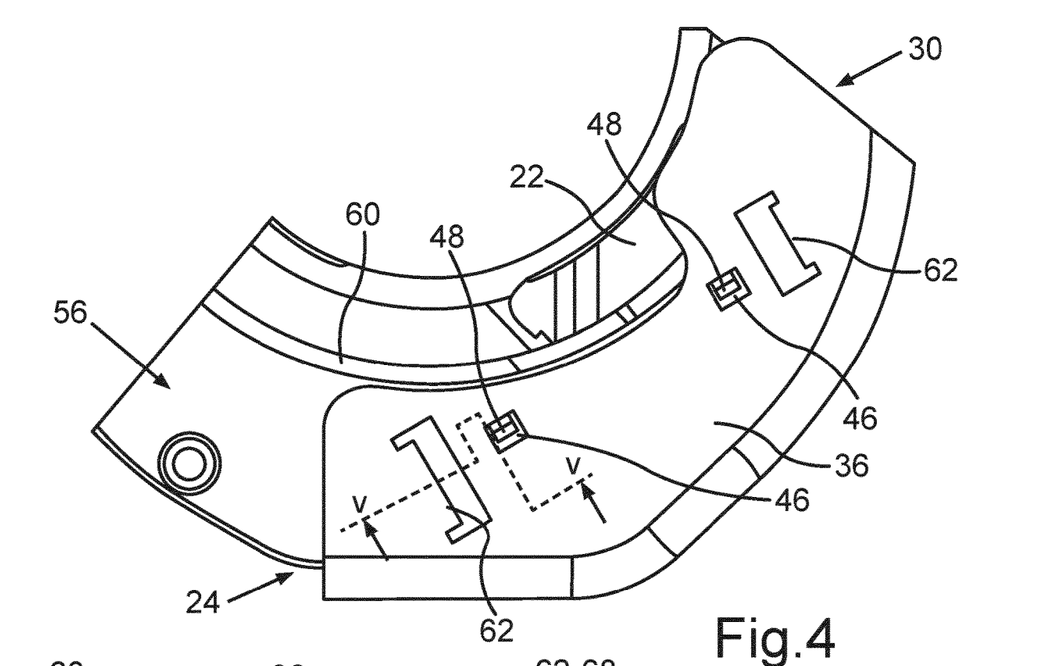
FIG. 4 shows a plan view from above of the components of the sensor assembly shown in FIG. 2.

The stator 20 usually also includes flux conductors, which conduct the magnetic flux of the ring magnet of the magnetic device 16 to the at least one magnetic field sensor 14. A detail of one of these flux conductors 22 is shown in FIG. 4.

The at least one magnetic field sensor 14, which can be designed as a Hall sensor, for example, and is usually fastened to a printed circuit board, is arranged within a housing 24 of the sensor assembly 10 in the present case.

When the sensor assembly 10 is designed as a torque sensor, the ring magnet (not shown) of the magnetic device 16 is usually connected to the first or input-side shaft part of the steering shaft, i.e. to that shaft part which is connected to the motor vehicle steering wheel for rotation therewith. In contrast, the sleeve 18 is connected to the output-side or second shaft part of the steering shaft, i.e. to the road-side shaft part.

If the steering shaft is now rotated about its axis of rotation 12 by operating the steering wheel, this also causes a very slight rotation of the input-side shaft part and thus of the ring magnet relative to the output-side shaft part, to which the stator 20 is connected for rotation therewith. This changes the alignment of the pole pairs of the ring magnet with respect to the stator teeth of the ring-shaped stator parts of the stator 20. This is expressed in a change in the flux density of the magnetic field generated by the magnetic device 16 and detectable by means of the at least one magnetic field sensor 14.

When the sensor assembly 10 is designed as a torque sensor, a torsion bar with a defined and known torsional rigidity also connects the shaft parts of the steering shaft, which is divided in the axial direction, i.e. in the direction of the axis of rotation 12, to one another. The torque applied to the steering shaft can therefore be determined from the rotation of the two shaft parts with respect to one another by an angle of rotation which is dependent on the torque applied and on the rigidity of the torsion bar, taking into account the torsional rigidity.

Furthermore, if the sensor assembly 10 is embodied as a steering angle sensor assembly, the angle of rotation of the steering shaft with respect to an initial position or straight-ahead position of the steering shaft or the steering wheel coupled to the steering shaft can also be determined by means of the at least one magnetic field sensor 14. Here, too, the at least one magnetic field sensor 14 detects the change in a magnetic field generated by a permanent magnet of the magnetic device 16. This magnetic field depends on the angle of rotation of the steering shaft. Further relevant details regarding the technical configuration of the sensor assembly 10 as a steering angle sensor assembly can be found in DE 10 2016 124 370 A1, for example, and therefore such details will not be discussed in more detail here.

The at least one magnetic field sensor 14 is in this case accommodated in a housing region 26 of the housing 24, which housing region is designed in the manner of a wide flange running at a short distance around the axis of rotation 12 in the circumferential direction and protruding somewhat in the radial direction. The printed circuit board on which the at least one magnetic field sensor 14 is arranged is accommodated in this housing region 26.

The housing 24 comprising the housing region 26 remains stationary in the motor vehicle when the sensor assembly 10 is arranged on the steering shaft of the motor vehicle. By contrast, rotation of both the stator 20 and the ring magnet (not shown) of the magnetic device 16 relative to the housing 24 and thus relative to the at least one magnetic field sensor 14 is possible.

In order to shield the magnetic field sensor 14 from disruptive influences from external magnetic fields, i.e. from magnetic fields that may be present in an environment 28 of the sensor assembly 10, the sensor assembly 10 here has a shielding device 30, which is shown removed from the housing 24 in FIG. 1. While the housing 24 is usually formed from plastic, the shielding device 30 is preferably formed from at least one metal, for example from a material containing iron and/or nickel.

Figure 2:
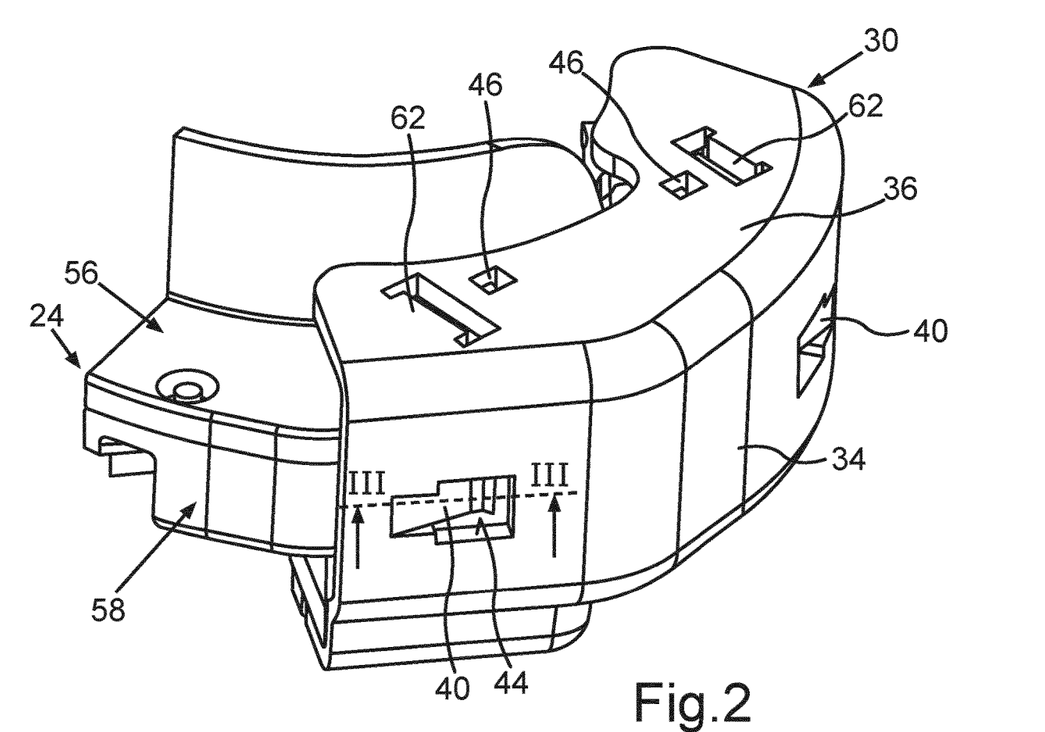
FIG. 2 shows components of the sensor assembly according to FIG. 1, the shielding device being attached to the housing or being held on the housing by means of a latching connection.

In the present case, the shielding device 30 can be latched to the housing 24 in order to ensure that the shielding device 30 is mounted on the housing 24 (cf. FIG. 2). In other words, the shielding device 30 can be held on the housing 24 by means of a latching connection. This mounting of the shielding device 30 on the housing 24 by latching the shielding device 30 to the housing 24 is illustrated in FIG. 2.

In order to effect the latching of the shielding device 30 on the housing 24, the shielding device 30 can be pushed here onto the housing 24 in the radial direction, which is illustrated in FIG. 1 by an arrow 32.

According to FIG. 1, the shielding device 30 has a U profile in cross section. In this case, when the shielding device 30 is attached to the housing 24, a casing wall 34 of the shielding device 30, which is aligned substantially parallel to the axis of rotation 12, surrounds the housing region 26 at at least a short distance in the circumferential direction of the housing 24. Accordingly, the housing region 26 in which the at least one magnetic field sensor 14 is arranged is shielded by the casing wall 34 of the shielding device 30 in the radial direction from the environment 28.

Furthermore, the U profile of the shielding device 30 comprises a first wall section 36, which is the upper section in FIG. 1 and which extends from the casing wall 34 toward the axis of rotation 12. Said first wall section 36 thus shields the housing region 26 in the direction of the axis of rotation 12 and here upward according to FIG. 1. In the actual installed position of the sensor assembly 10 which is attached to the steering shaft, said first wall section 36 of the shielding device 30 forms a partial area on the underside of the shielding device 30.

The shielding device 30, which has the U profile in cross section, has a second wall section 38, which is aligned substantially parallel to the first wall section 36 and of which only a small part can be seen in FIG. 1. The housing region 26 is arranged between the first wall section 36 and the second wall section 38 when the shielding device 30 is latched to the housing 24. The second wall section 38 thus shields the at least one magnetic field sensor 14 downward in the direction of the axis of rotation 12 according to the illustration in FIG. 1.

Figure 6:
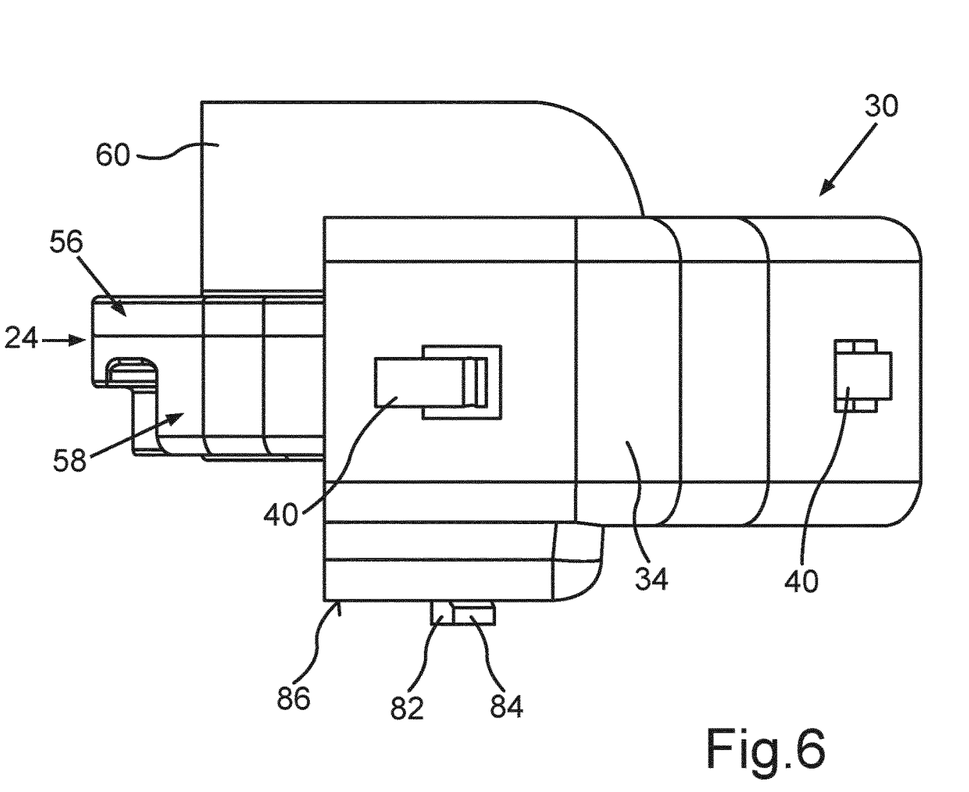
FIG. 6 shows a side view of the components of the sensor assembly according to FIG. 2.

It can be seen in particular from FIG. 2 and from FIG. 6 that the shielding device 30 can have two spring elements which are designed in the manner of spring tongues 40 in the variant of the shielding device 30 shown by way of example here. In this case, the spring tongues are formed from a wall material of the casing wall 34, for example by cutting the spring tongues 40 free from the casing wall 34.

Figure 3:
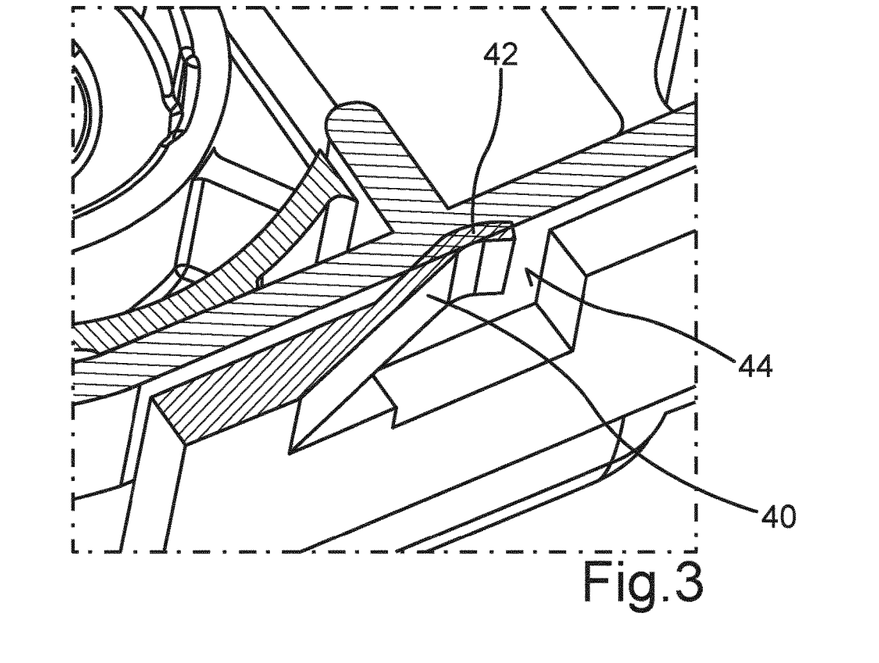
FIG. 3 shows a perspective view of the sensor assembly sectioned along a line III-III in FIG. 2.

The respective spring tongue 40 lies with a contact region 42 against an outer side 44 of the housing 24 in the housing region 26 (cf. FIG. 3). In other words, the respective spring tongue 40 is supported with its contact region 42 on the outer side 44 of the housing region 26. The at least one spring element, here in the form of the two spring tongues 40, ensures that the shielding device 30 is mounted on the housing 24 without vibrating or rattling.

Furthermore, the spring tongues 40 preferably ensure that the casing wall 34 of the shielding device 30 is somewhat spaced apart from the outer side 44 of the housing region 26 (cf. FIG. 3).

Possibilities of providing the latching connection between the housing 24 and the shielding device 30 will be explained in particular with reference to FIG. 4 and to FIG. 5. For example, latching elements in the form of latching openings 46 can be formed namely in the first wall section 36 (cf. FIG. 1). One of said latching openings 46 provided in the first wall section 36 is shown in section in FIG. 5. In addition or as an alternative, the second wall section 38 can also have such latching elements, for example designed as latching openings 46 (cf. FIG. 1).

In the present case, respective latching lugs 48 are provided on the side of the housing 24 as second latching elements corresponding to said first latching elements, in order to provide the latching connection. Two such latching lugs 48 are shown in perspective in FIG. 1 and in a plan view from above in FIG. 4, i.e. in the direction of the axis of rotation 12. One of these two latching lugs 48 is shown in perspective in FIG. 5, with the latching lug 48 engaging in the latching opening 46.

Figure 5:
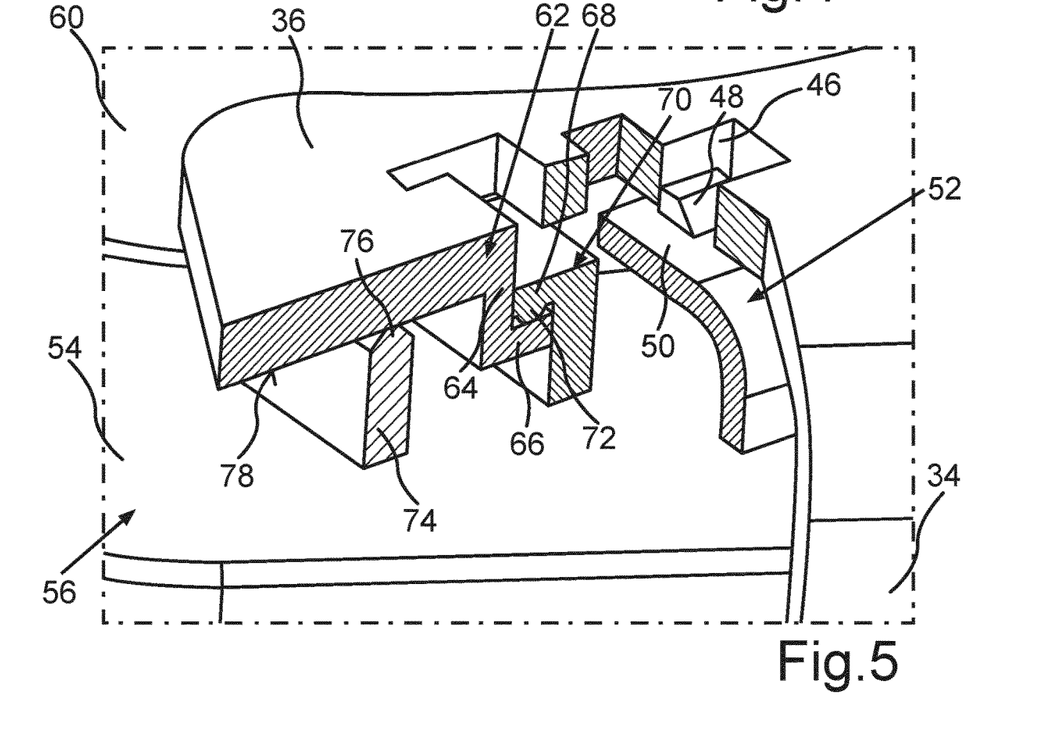
FIG. 5 shows a perspective view of the sensor assembly sectioned along a line V-V in FIG. 4.

It can be seen in particular from FIG. 5 in conjunction with FIG. 1 that the latching lugs 48 are formed here on a free end region 50 of a respective profile part 52 which is formed integrally with a wall 54 of the housing region 26. In the present case, this wall 54 is part of a first housing part 56 of the housing 24. The first housing part 56 is connected here to a second housing part 58 of the housing 24 to form the housing 24.

The wall 54 of the first housing part 56 protrudes here in the radial direction from a further wall 60 of the first housing part 56, which, according to FIG. 1, runs at a short distance around the sleeve 18. When the shielding device 30 is held on the housing 24, a narrow side of the first wall section 36 can lie against this further or second wall 60 or be slightly spaced apart from the second wall 60 (cf. FIG. 5).

In the direction of the axis of rotation 12, the free end region 50 of the profile part 52, which is designed here in the manner of a horizontal J in cross section, is spaced apart from the wall 54. Accordingly, the free end region 50 can deviate in the direction of the axis of rotation 12 when the shielding device 30 is pushed onto the housing 24 in the housing region 26 in the radial direction and as indicated in FIG. 1 by the arrow 32 in FIG. 1.

In the present case, the shielding device 30 has two hook elements 62 (cf. FIG. 1 and FIG. 4) as further holding elements or fixing elements, one of which is shown in section and enlarged in FIG. 5. According to FIG. 5, the respective hook element 62 has a first leg 64 which extends in the direction of the axis of rotation 12. A second leg 66 protrudes from said first leg 64 and is aligned here substantially parallel to the wall 54.

Said second leg 66 engages behind a holding section 68 of a holding part 70 which, like the profile part 52, is preferably formed integrally with the wall 54. Like the second leg 66, the holding section 68 also extends here substantially parallel to the wall 54. Furthermore, the holding section 68 of the respective holding part 70 is spaced apart from the wall 54 in the direction of the axis of rotation 12.

It can also be seen in particular from FIG. 5 that the holding section 68 can have a rib 72 which tapers toward the second leg 66 of the hook element 62. Such a squeezing rib is advantageous in respect of the vibration-free or rattling-free fixing of the shielding device to the housing 24.

In the present case, the housing 24 has respective webs 74 as further fastening parts, which webs also protrude in the direction of the axis of rotation 12 from the wall 54 of the housing region 26 in which the at least one magnetic field sensor 14 is received or accommodated. The two webs 74 shown by way of example protrude here from the wall 54 in the same direction as do the holding parts 70 and the profile parts 52 of the housing 24.

In the present case, the respective webs 74 have an end region 76 which tapers or converges to a point and which can be seen particularly well in the sectional illustration in FIG. 5.

With this end region 76 designed in the manner of a rib converging to a point, the respective web 74 lies against an inner side 78 of the first wall section 36 facing towards the housing region 26. Consequently, the shielding device 30 is clamped by means of the respective hook element 62 in interaction with the respective holding part 70 and the webs 74 in the direction of the axis of rotation 12 in the manner of a press fit.

Furthermore, an elastic deformation of the components, designed in the manner of squeezing ribs, of the housing 24 in the form of the rib 72 and the end region 76 can support the secure and rattle-free fixing of the shielding device 30 to the housing 24.

It can be clearly seen from FIG. 1 in combination with FIG. 6 that the second wall section 38 has a cutout or recess 80 which is open toward the axis of rotation 12 and is in the present case rectangular. A projection 82 is accommodated in this recess 80, which projection here is a component part of the second housing part 58 and protrudes from the second housing part 58 in the direction of the axis of rotation 12, specifically in a direction opposed to the height of the webs 74.

Inserting the projection 82 into the recess 80 creates a guiding aid in the form of a tongue and groove connection, which makes it easier to slide the shielding device 30 onto the housing 24 in the radial direction.

In addition, the projection 82, as shown here by way of example, can have a holding leg 84 which lies against an outer side 86 of the second wall section 38 that faces away from the housing region 26 (cf. FIG. 6). This holding leg 84 ensures that the shielding device 30 is additionally fixed in the direction of the axis of rotation 12 when the shielding device 30 is attached to or held on the housing 24 by latching.

The invention claimed is:

1. A sensor assembly for detecting rotation of a shaft about an axis of rotation, the sensor assembly comprising
a housing in which at least one magnetic field sensor is arranged,
wherein the at least one magnetic field sensor is configured to detect a change in a magnetic field generated by a magnetic device of the sensor assembly, said change being associated with the rotation of the shaft about the axis of rotation; and
a shielding device arranged on the housing for shielding the at least one magnetic field sensor relative to an environment of the sensor assembly, the shielding device being removable from the housing,
wherein the shielding device is held on the housing by a latching connection.

2. The sensor assembly as claimed in claim 1, wherein the shielding device is formed from at least one metal, and has at least one spring element which lies against the housing when the shielding device is held on the housing by the latching connection.

3. The sensor assembly as claimed in claim 1, wherein at least one first latching element, is a latching opening and is formed on the shielding device, and at least one second latching element is a latching lug and is formed on the housing, wherein the second latching element is brought into engagement with the first latching element to produce the latching connection.

4. The sensor assembly as claimed in claim 1, wherein the shielding device can be slid onto the housing in the radial direction with respect to the axis of rotation and has a U profile in cross section with a casing wall aligned substantially parallel to the axis of rotation and two wall sections extending from the casing wall substantially in the radial direction, with a housing region of the housing accommodating the at least one magnetic field sensor being arranged between the wall sections.

5. The sensor assembly as claimed in claim 4, wherein the at least one first latching element is formed on at least one of the wall sections and/or the at least one second latching element is formed on a free end region of a profile part which is arranged on a wall of the housing region, the end region of the profile part having the second latching element being spaced apart from the wall of the housing region in the direction of the axis of rotation.

6. The sensor assembly as claimed in claim 4, wherein at least one hook element, formed from a wall material of the wall section, is formed on at least one of the wall sections and has a first leg extending in the direction of the axis of rotation and a second leg protruding from the first leg, wherein the second leg engages behind a holding section of a holding part arranged on the housing.

7. The sensor assembly as claimed in claim 6, wherein the holding part is arranged on a wall of the housing region in which the at least one magnetic field sensor is accommodated, the holding section of the holding part, said holding section in particular having a rib tapering toward the second leg, being spaced apart from the wall of the housing region in the direction of the axis of rotation.

8. The sensor assembly as claimed in claim 4, wherein at least one of the wall sections, with an inner side facing the housing region, lies against at least one web having an end region tapering toward the inner side, which web protrudes in the direction of the axis of rotation from a wall of the housing region in which the at least one magnetic field sensor is accommodated.

9. The sensor assembly as claimed in claim 4, wherein at least one of the wall sections has a recess which is open toward the axis of rotation and in which a projection is accommodated as a result of the shielding device being pushed onto the housing, the projection protruding from the housing in the direction of the axis of rotation.

10. The sensor assembly as claimed in claim 9, wherein projection has a holding leg which lies against an outer side of the wall section that faces away from the housing region.

11. The sensor assembly as claimed in claim 1, wherein the sensor assembly is configured to detect a torque applied when the shaft rotates about the axis of rotation and/or to detect an angle of rotation of the shaft.

\* \* \* \* \*